(12) United States Patent
Kwong

(10) Patent No.: US 8,739,190 B2
(45) Date of Patent: May 27, 2014

(54) DETERMINING AN EXTENSION TO USE TO PROCESS AN INPUT OBJECT TO A CALL IN A PROGRAM

(75) Inventor: Michael Yiupun Kwong, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/592,166

(22) Filed: Aug. 22, 2012

(65) Prior Publication Data

US 2013/0007776 A1    Jan. 3, 2013

Related U.S. Application Data

(63) Continuation of application No. 11/614,922, filed on Dec. 21, 2006, now Pat. No. 8,307,379.

(51) Int. Cl.
*G06F 3/00*      (2006.01)
*G06F 9/44*      (2006.01)
*G06F 9/445*     (2006.01)

(52) U.S. Cl.
USPC ............ 719/330; 717/100; 717/101; 717/174

(58) Field of Classification Search
None
See application file for complete search history.

(56) References Cited

U.S. PATENT DOCUMENTS

| | | | |
|---|---|---|---|
| 6,160,550 A * | 12/2000 | Nakajima et al. ............. | 719/330 |
| 6,304,922 B2 | 10/2001 | Kimura et al. | |
| 6,385,660 B2 | 5/2002 | Griesemer et al. | |
| 6,721,807 B2 | 4/2004 | Vlissides | |
| 6,754,652 B2 | 6/2004 | Bestgen et al. | |
| 6,829,771 B1 | 12/2004 | Bahrs et al. | |
| 6,968,538 B2 | 11/2005 | Rust et al. | |
| 7,415,713 B2 * | 8/2008 | Kukura et al. ................ | 719/330 |
| 7,752,637 B2 * | 7/2010 | Gunduc et al. ................ | 719/330 |
| 2004/0003119 A1 | 1/2004 | Munir et al. | |
| 2004/0003371 A1 * | 1/2004 | Coulthard et al. ............ | 717/101 |
| 2004/0225994 A1 * | 11/2004 | Wason et al. ................. | 717/100 |
| 2004/0244009 A1 | 12/2004 | Bak et al. | |
| 2005/0071806 A1 | 3/2005 | Sreedhar | |
| 2006/0015867 A1 * | 1/2006 | Drittler et al. ................ | 717/174 |
| 2006/0069578 A1 | 3/2006 | Borkowski et al. | |

(Continued)

OTHER PUBLICATIONS

"Modeling Interface Definition Language Extension", Jacobsen, 2000, pp. 1-10.*

(Continued)

*Primary Examiner* — Tuan Dao

(74) *Attorney, Agent, or Firm* — Konrad Raynes Davda & Victor LLP; David W. Victor

(57) ABSTRACT

Provided are a method, system, and article of manufacture for determining an extension to use to process an input object to a call in a program. An association of parameter definitions is indicated with extensions, where each extension comprises a program capable of being selected to process at least one input object. A call is received for an extension point including at least one input object to determine one extension to use to process the at least one object. A determination is made of a set of candidate extensions capable of processing the at least one input object based on a first criteria determining extensions whose parameter definitions are capable of satisfying the requirements defined for the extension point. A selection is made from the set of candidate extensions of one extension to use to process the at least one object using a second criteria.

21 Claims, 5 Drawing Sheets

(56) References Cited

U.S. PATENT DOCUMENTS

| | | | |
|---|---|---|---|
| 2006/0164269 A1 | 7/2006 | Trimbell et al. | |
| 2006/0206890 A1 | 9/2006 | Shenfield et al. | |
| 2006/0277537 A1* | 12/2006 | Chan et al. | 717/168 |
| 2008/0155555 A1 | 6/2008 | Kwong | |
| 2008/0244506 A1* | 10/2008 | Killian et al. | 717/100 |

OTHER PUBLICATIONS

"Java Management Extensions for Application Management", Kreger, 2001, pp. 1-26.*

Appleton-Day, K. and L. Shao, "Real Time Dispatch Gets Real Time Results", Proceedings of the 1997 IEEE International Symposium on Semiconductor Manufacturing, Oct. 1997, p. 1-p. 5.

Delap, S., "Understanding How Eclipse Plug-ins Work with OSGi", [online], Jun. 6, 2006, [retrieved on Nov. 7, 2006], retreived from the Internet at <URL: http://www-128.ibm.com/developerworks/opensource/library/os-ecl-osgi/>.

Des Rivieres, J. and J. Wiegand, "Eclipse: A Platform for Integrating Development Tools", IBM Systems Journal, vol. 43, No. 2, 2004, pp. 371-383.

Hu, E.Y., G. Bernat, and A. Wellings, "Addressing Dynamic Dispatching Issues in WCET Analysis for Object-Oriented Hard Real-Time Systems", Proceedings of the Fifth IEEE Symposium on Object-Oriented Real-Time Distributed Computing, 2002, 8 pp.

IBM Corporation, "Eclipse Platform Technical Overview", White Paper, 2006, pp. 1-19.

Marchal, B., "Working XML: Define and Load Extension Points", [online], Feb. 3, 2005, [retrieved on Nov. 7, 2006], retrieved from the Internet at <URL: http://www-128.ibm.com/developerworks/xml/library/x-wxxm29.html>.

Wikipedia, "Eclipse (software)", [online], [retrieved on Nov. 15, 2006], retrieved from the Internet at <URL: http://en.wikipedia.org/w/index.php?title=Eclipse_%28software%29< . . . >.

Amendment 1, Jun. 17, 2011, for U.S. Appl. No. 11/614,922, filed Dec. 21, 2006 by M.Y. Kwong, Total 16 pp. [57.101 (Amend1)].

Amendment 2, Mar. 20, 2012, for U.S. Appl. No. 11/614,922, filed Dec. 21, 2006 by M.Y. Kwong, Total 13 pp. [57.101 (Amend2)].

Final Office Action 1, Jan. 13, 2012, for U.S. Appl. No. 11/614,922, filed Dec. 21, 2006 by M.Y. Kwong, Total 25 pp. [57.101 (FOA1)].

Notice of Allowance 1, Jun. 26, 2012, for U.S. Appl. No. 11/614,922, filed Dec. 21, 2006 by M.Y. Kwong, Total 8 pp. [57.101 (NOA1)].

Office Action 1, Feb. 17, 2011, for U.S. Appl. No. 11/614,922, filed Dec. 21, 2006 by M.Y. Kwong, Total 23 pp. [57.101 (OA1)].

* cited by examiner

DETERMINING AN EXTENSION TO USE TO PROCESS AN INPUT OBJECT TO A CALL IN A PROGRAM

CROSS-REFERENCE TO RELATED APPLICATION

This application is a continuation of U.S. patent application Ser. No. 11/614,922, filed Dec. 21, 2006, now U.S. Pat. No. 8,307,379, which application is incorporated herein by reference in its entirety.

BACKGROUND OF THE INVENTION

1. Field

The present invention relates to a method, system, and article of manufacture for determining an appropriate extension to use to process one or more input objects to a call in a program 2. Description of the Related Art An integrated development environment (IDE), also known as an integrated design environment and integrated debugging environment, comprises a computer program or development tool that assists computer programmers in developing software. IDEs normally consist of a source code editor, a compiler and/or interpreter, build-automation tools, and (usually) a debugger. Sometimes a version control system and various tools to simplify the construction of a GUI are integrated as well.

The Eclipse Foundation, Inc. is an open source community whose projects are focused on providing a vendor-neutral open development platform and application frameworks for building software. The Eclipse™ IDE tool provides an open source platform-independent software framework for delivering tools to developers. The Eclipse framework is fully extensible, allowing any third party to supply program code, called extensions or plug-ins, to extend the behavior of other program code at predefined points in the program, referred to as extension points. An extension point comprises a point in the program code where the application developer intended to enable third parties to add extensions to customize behavior at that point. For instance, extension points are used to allow customization of user interfaces, such as menu items, etc., that are provided at a point in the program. Extension points and extensions allows for loose coupling of software components running inside the framework. (Eclipse is a trademark of Eclipse Foundation, Inc.)

An extension point in the code has a schema file providing documentation for the extension point that declares the elements and attributes that extensions (defined by plug-ins) developed for that extension point must declare. The schema is used during plug-in development to detect invalid extensions and to guide the extension developer. Third parties may develop the extensions to use at the declared extension point. Extensions are structured bundles of code and/or data that contribute function to the system. Function can be contributed in the form of code libraries (Java™ classes with public application program interfaces (APIs)), platform extensions, documentation, etc. (Java and all Java-based trademarks are trademarks of Sun Microsystems, Inc. in the United States, other countries, or both.)

The extension developer provides metadata about the extension (defined in a plug-in). The extensions are registered during runtime so that they may be discovered for use at a corresponding extension point in the code. The metadata associated with an extension can be used to specialize and customize the behavior of the extension. One common use of the metadata is to specify the object type that a given extension class can process. The dispatcher code for handling an extension point may use the metadata for the registered extensions to determine an extension capable of supporting the object presented at the extension point for processing. The determined extension is then invoked to process the object. This arrangement provides a flexible framework where the input object types at an extension and the algorithms used for processing them can be extended, and evolved with minimal coupling. For example, this pattern is used in the extension point for contributing menu actions to the context menu in the Eclipse framework. Third party developers can create their own menu actions for objects of their choice, without having to modify the base Eclipse code responsible for displaying the views and the context menus.

There is a need in the art to provide improved techniques for selecting extensions to use to process an object at an extension point in the program.

SUMMARY

Provided are a method, system, and article of manufacture for determining an extension to use to process an input object to a call in a program. An association of parameter definitions is indicated with extensions, where each extension comprises a program capable of being selected to process at least one input object as part of an operation. A call is received for an extension point including at least one input object to determine one extension to use to process the at least one object, wherein requirements are defined for the extension point. A determination is made of a set of candidate extensions capable of processing the at least one input object based on a first criteria determining extensions whose parameter definitions are capable of satisfying the requirements defined for the extension point. A selection is made from the set of candidate extensions of one extension to use to process the at least one object using a second criteria.

DETAILED DESCRIPTION

Figure 1:
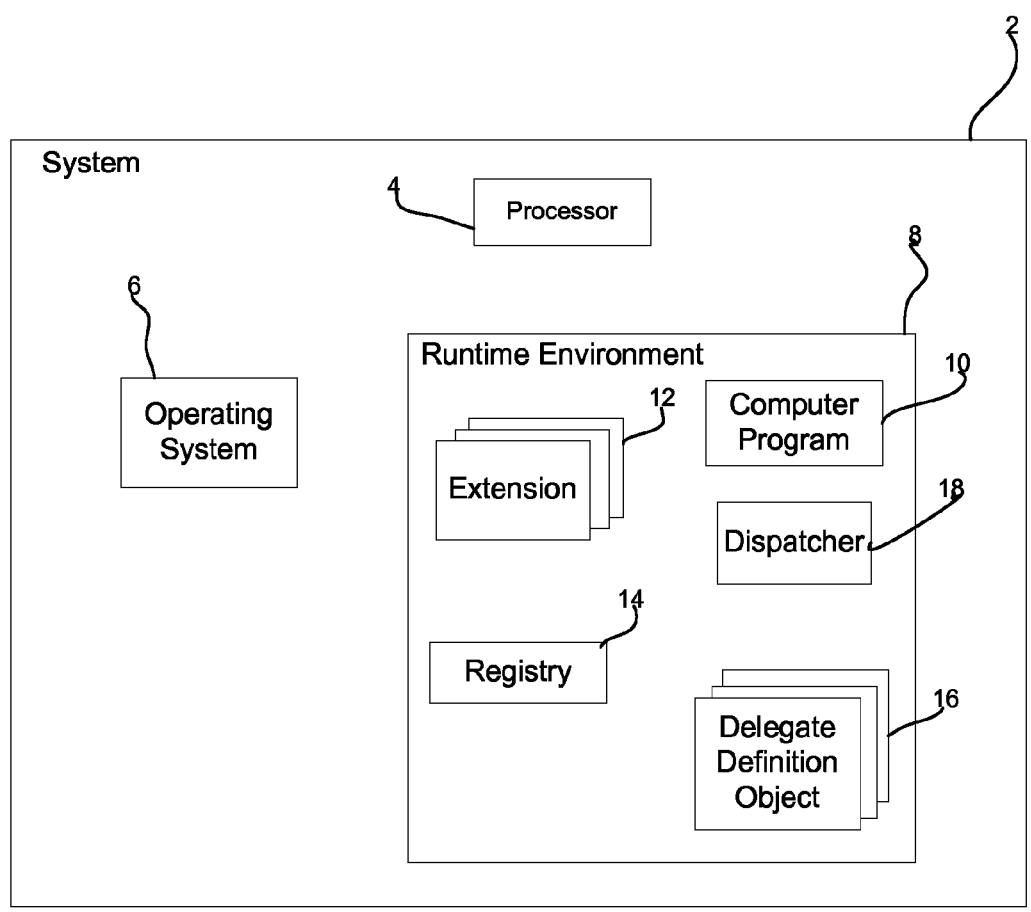
FIG. 1 illustrates an embodiment of a computing environment.

FIG. 1 illustrates a computing environment in which embodiments may be implemented. A system 2 includes a processor 4 and operating system 6. The operating system 6 implements a runtime environment 8 in which programs run. A computer program 10 executes in the runtime environment 8. In one embodiment, the computer program 10 includes extension points. An extension point is a location in the program 10 at which a dynamic determination may be made of one of a plurality of extensions 12, such as plug-ins, functions, etc., that may be called to process one or more objects. The extensions 12 considered for use at the extension points may be provided by third party developers. The extension 12 selected is based on attributes of the object that is being processed at the extension point and attributes of the extensions 12.

At runtime, during initialization, the extensions 12 may be registered in a registry 14 using metadata information the developer provides with the extension 12. When registering a new extension, a delegate definition object 16 is generated for the added extension 12 based on metadata information associated with the extension 12. A dispatcher 18 comprises the methods and functions that select an extension 12 to use to process one or more objects at an extension point by considering attributes of the one or more objects to process and attributes of registered extensions 12 as stored in the delegate definition objects 16.

Figure 2:
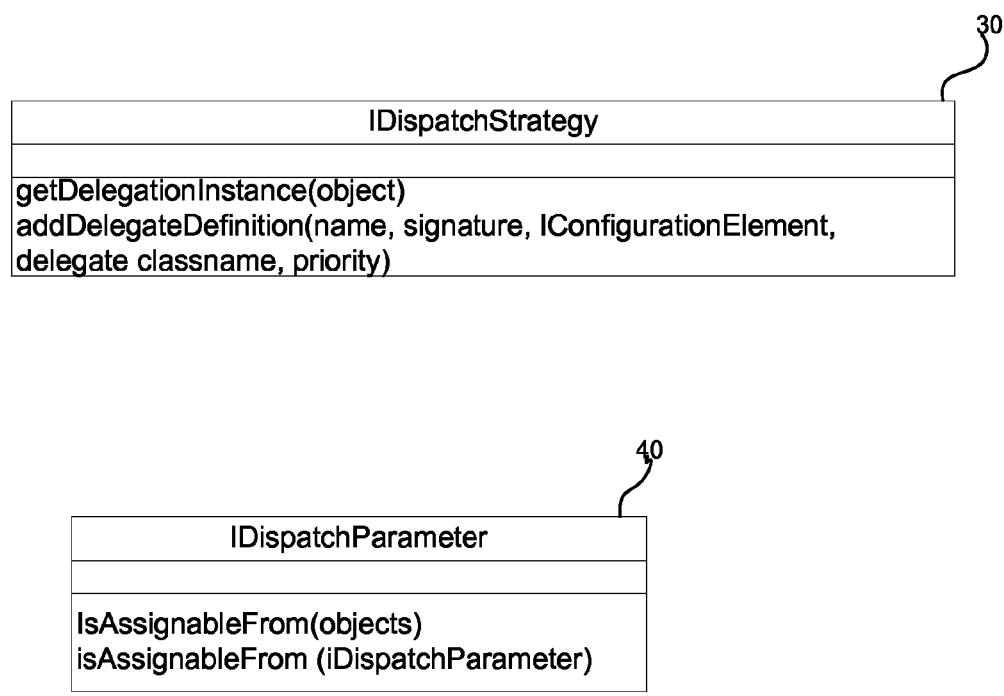
FIG. 2 illustrates an embodiment of classes used to add information on extensions and determine an extension to use to process an object at an extension point.

FIG. 2 illustrates an iDispatchStrategy interface 20 and an iDispatchParameter interface 30 that may implement the dispatcher 18 component. In certain embodiments, there may be more than one implementation of each of these interfaces, making it possible for the dispatch algorithm to be customized and extended. Default implementations of these interfaces are provided as part of the framework to readily handle the common dispatch scenarios. Dispatch scenarios with special needs may require the developer to create alternative implementations of these interfaces.

The purpose of the iDispatchStrategy interface is to encapsulate the dispatch algorithm. The iDispatchStrategy interface includes a getDelegationInstance and an addDelegateDefinition method. The getDelegationInstance method may be called at an extension point in the computer program 10 with the one or more input objects to process and returns one of the registered extension points 12 to process the objects. The returned extension point can in turn be invoked to handle the one or more input objects to be processed.

The addDelegateDefinition method is invoked as part of the initialization process for all registered extensions. It generates a delegate definition object 16 for storing metadata associated with an added extension 12, using the following parameters providing attributes of the extension:

name—name used to identify the extension to the user.
signature—representation of the types of parameters the extension class is intended to handle.
IConfigurationElement—element used for obtaining further info from the extension point, and to load the extension.
Delegate ClassName—name of the extension class to be loaded
priority—hint to the dispatcher 18 to disambiguate two extensions, i.e., extension classes, that can be used to handle the same set of parameters. The implementation of the dispatcher 18 may chose to use or ignore the priority.

A delegateDefinition class may include GET methods to obtain information from the delegate definition objects 16, such as a getName and getPriority methods to obtain an extension 12 name and priority for an extension. Further, a getDispatchParameter method returns an object encapsulating the type and parameter values the extension 12 can handle as indicated in the signature attribute of the delegate definition object 16. The type and parameter values returned in response to the getDispatchParameter call may be represented in an IDispatchParameter object. For instance, for the embodiment of the extension point designed for copying files, the appropriate algorithm that should be used depends on the characteristics of both the source and target location: the type of source and target files, the operating system or file system on which the files are stored, etc. The IDispatchParameter object associated with each extension for the file copy extension point encapsulates both the information on what types of source and target locations that can be handled by the given extension.

A typical implementation of the getDelegateInstance method called with the one or more objects for which an extension is sought invokes methods of the iDispatchParameter interface 40 to determine an extension to use to process the objects. The iDispatchParameter interface 40 provides methods that work with the getDelegateInstance method to implement the dispatcher 18. Default implementations of the IDispatchParameter methods may be used to handle common dispatch scenarios, and customized or specialized implementations of the methods may be necessary if there are special needs.

The IDispatchParameter may define two "isAssignableFrom" methods. A first isAssignableFrom method is called with the one or more objects for which an extension is required. This first isAssignableFrom method uses a first criteria to determine those extensions 12 that are candidates, i.e., enabled, to process the one or more input objects based on the types or attribute values of the input objects, and the meta data information that are associated with each extension. The first criteria applied by the "isAssignableFrom" method may determine extensions that are defined to have parameter definitions that can handle the number of input objects provided at the extension point and that satisfy specified attribute values of the one or more input objects. An object oriented style, polymorphic dispatch can be achieved by arranging all possible input objects in input object space into a hierarchy, and by assuming that an extension that is registered to handle an object that is higher in the hierarchy (more general) can also handle an object that is lower in the hierarchy (more specific). Alternative dispatch rules (other than the polymorphic dispatch rule) can be created by associating alternative implementations of the IDispatchParameter interface with the extensions for a given extension point, allowing for flexibility in the dispatch framework.

In one embodiment, attributes of the possible input objects could be arranged into a hierarchy based on the type information (for an object oriented system) or according to rules encapsulated with the specific IDispatchParameter implementation.

A second "isAssignableFrom" method is used to determine whether a given extension should be selected over another eligible extension. The default getDelegationInstance method implementation uses this information to select the appropriate extension to use when there are multiple candidates, by selecting a "more specific" extension. In one embodiment, an extension whose parameter definitions indicate that the extension matches or satisfy attributes of the input objects at a greater level of specificity is selected over other candidate extensions. For instance, if the input object attributes are arranged in a hierarchy, then the second criteria may select the extension whose parameter definitions satisfy the attributes of the input objects at a lowest level in the hierarchy of the attributes. This may be appropriate if the "more specific" extension could take advantage of additional information that can be assumed for a smaller subset of possible input objects it is designed to handle. Alternative implementations of the IDispatchParameter interface can be chosen if a different algorithm for choosing between multiple candidate extensions is needed.

The described embodiments may be implemented in a language or runtime that does not support overloading of methods/functions, or that is not object oriented. In languages that do not support overloading, the two isAssignableFrom methods can be given different names.

Figure 3:
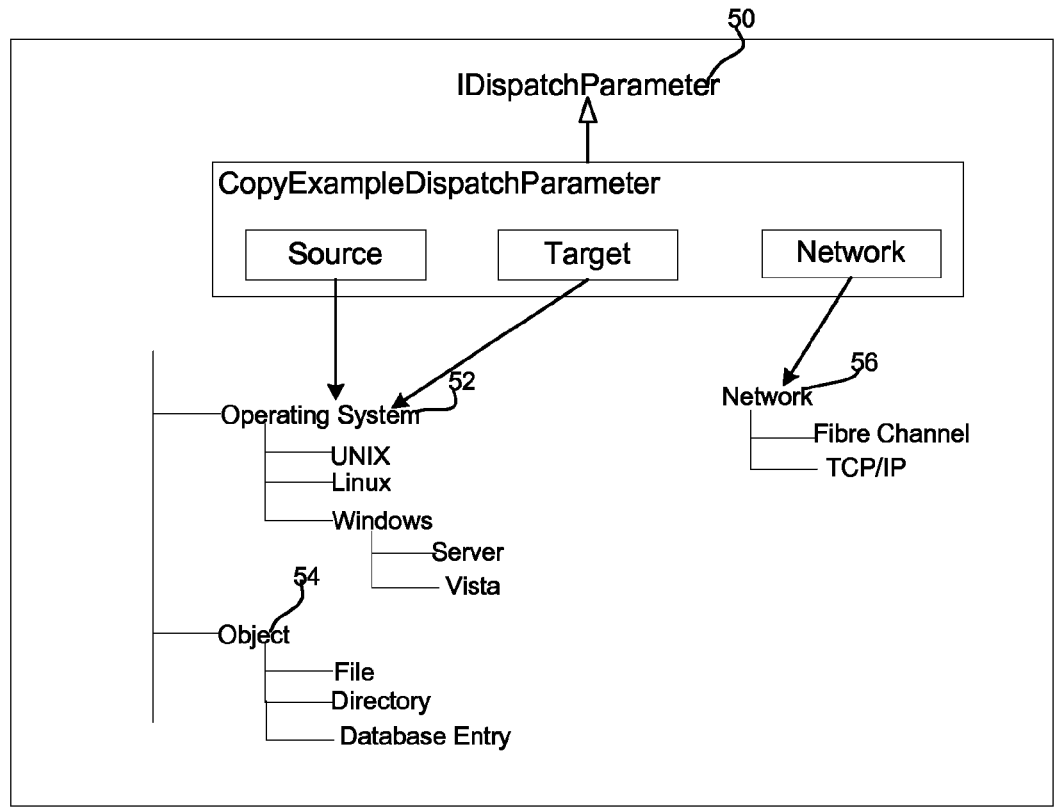
FIG. 3 illustrates an example of a hierarchical representation of parameter values for one or more objects.

FIG. 3 illustrates an example of an IDispatchParameter object 50 providing a hierarchical arrangement of the attributes for an input object being processed. The processing may comprise transforming the object, outputting the object or copying the object from a source to target location. The algorithm required for the processing may depend on many attributes, including the operating system on which the source and target locations reside, the type of file artifact to copy, and the network over which the data transfer is to occur. Depending on these attributes, the algorithms may perform code page conversions, end of line character conversions, and various checking to determine conformance to the rules for the source and target environments are conformed to. The attributes of the input objects can be arranged into a hierarchy. For instance, for an operating system type 52, the different possible attribute values that may be specified for the one or more input objects and the delegate definition objects 16 includes different possible operating systems, such as UNIX®, WINDOWS®, LINUX®, MVS™, etc. operating systems. These attribute values may also be provided at an even lower level in the hierarchy (a greater degree of specificity), such as for the version number, build, etc. of the operating system. These specialized values may appear at an even lower level in the hierarchy (a greater degree of specificity), e.g., WINDOWS SERVER® and WINDOWS VISTA™ shown for the WINDOWS operating system. At even lower hierarchical levels of specificity, operating system configuration settings may be provided for different versions. Other types of attribute values may comprise an object type 54 and a network type 56 for the network over which the input object may be transmitted. As discussed, there may be multiple lower levels of specificity in the hierarchy for more specific attribute values for the different attribute types, e.g., object types, networks, etc. (Microsoft, Windows, Windows NT, Windows Server, Windows Vista, and the Windows logo are trademarks of Microsoft Corporation in the United States, other countries, or both. UNIX is a registered trademark of The Open Group in the United States and other countries. Linux is a registered trademark of Linus Torvalds in the United States, other countries, or both. MVS is a trademark of International Business Machines Corporation in the United States, other countries, or both).

An IDispatchParameter may provide rules and definitions for the hierarchy of attributes. In an object oriented systems, the input objects often have class (type) information associated with them. One implementation of the IDispatchParameter creates a hierarchy based on the class hierarchy information that is defined by the type system of the language at runtime. An alternative implementation may construct the hierarchy information from rules that may be stored in a database, and membership of the input objects in the hierarchy may be determined by inspecting the appropriate attribute values of the input object. The developer for the extension point may choose the appropriate mechanism for constructing the hierarchy by choosing an appropriate pre-existing IDispatchParameter implementation, or if none exist, write a new implementation.

Once the hierarchy has been constructed, that information may be used to determine whether a given extension can be used to handle a given set of input. The attribute values associated with the input objects along with the parameter definitions associated with the extensions would be considered in the framework of the hierarchy represented in the iDispatchParameter object to determine the levels in the hierarchy at which the extension 12 parameter definitions, as specified in the delegate definition objects 16, match the attribute values of the one or more input objects. For instance, in a file copy embodiment, there may be an extension A that is registered to handle Windows files for all network protocols, an extension B registered to handle Vista files for all network protocols, an extension C registered to handle Vista database objects for all network protocols, and an extension D registered to handle all MVS objects for all network protocols. If the input is a Vista file transferred via a Transmission Control Protocol/Internet Protocol (TCP/IP) network, then extension A and extension B would both be found capable of handling this input object, but not extension C or D. If, for the next invocation, the input is an MVS file, then only extension D would be found capable of handling the new input object.

Figure 4:
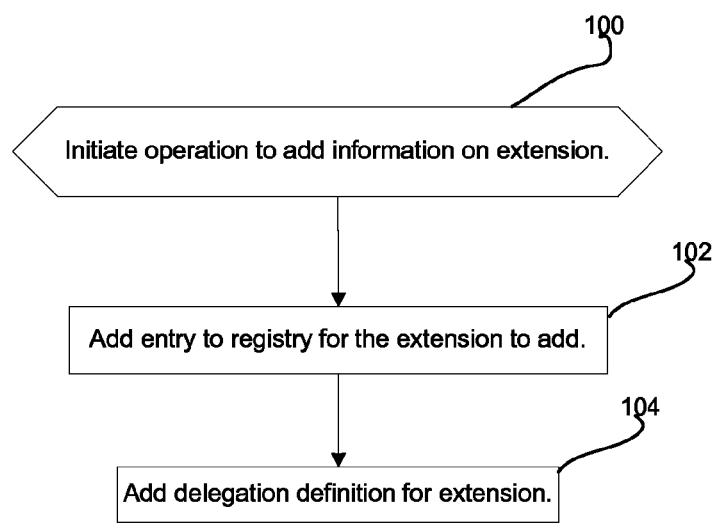
FIG. 4 illustrates an embodiment of operations performed to register and provide information on extensions that may be invoked at an extension point.

FIG. 4 illustrates an embodiment of the operations performed as part of the initialization process of an extension point. For each extension 12 defined for a given extension point, the dispatcher 18, implemented using the IDispatchStrategy interface 30 methods, such as the addDelegateDefinition method, adds information on a new extension 12. In response to invoking (at block 100) an operation to add an extension 12, an entry is added (at block 102) to the registry 14, which may involve the use of methods from a registry related class. A delegation definition 16 may be added (at block 104) for the registered extension 12, which may be performed by a call to the addDelegateDefinition method to create a delegate definition object 16 having a name, a signature of parameters, a priority hint, etc.

Figure 5:
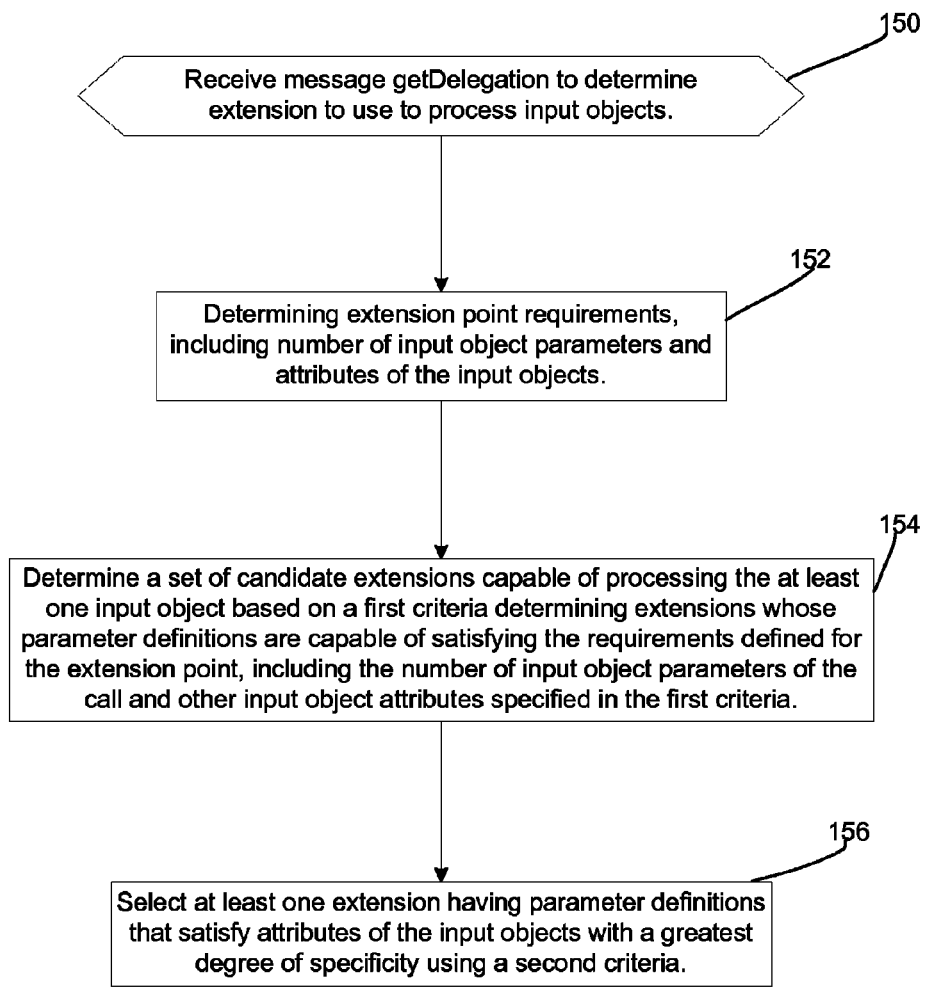
FIG. 5 illustrates an embodiment of operations to select an extension to use at an extension point in a program to process one or more input objects.

FIG. 5 illustrates an embodiment of operations the dispatcher 18 performs to select an extension 12 to use to process one or more input objects at an extension point in the computer program 10, which may be implemented in the Default IDispatchStrategy. In response to a call (at block 150) to select an extension for one or more input objects, which may be invoked by the getDelegationInstance method called with the one or more input objects (the number of input objects depend on the extension point concerned), the dispatcher 18 determines (at block 152) extension point requirements, including a number of input object parameters and attributes of the input objects expected at the extension point. The attributes of the input objects defined as required for the extension point may include an object type, operating system requirement for the object, etc. The dispatcher 18 determines (at block 154) a set of candidate extensions 12 capable of processing the at least one input object based on a first criteria determining extensions whose parameter definitions are capable of satisfying the requirements defined for the extension point, including the number of input object parameters expected for the call and other input object attributes specified in the first criteria. In certain embodiments, the extensions 10 have associated parameter definitions that indicate what subset among the possible input objects the extensions could handle. For a given set of input objects, the dispatcher 18 may determine which extensions 10 can handle the input objects based on the parameter definitions. The dispatcher 18 then selects (at block 156) at least one extension having parameter definitions that satisfy (e.g., match or otherwise satisfy the criteria) attributes of the input objects with a greatest degree of specificity according to a second criteria. The second criteria may apply some ordering or ranking of the attributes of the input objects, which may be defined in the IDispatchParameter implementation, such that extensions 12 that satisfy a most or greater number of attributes having a higher ranking or ordering are selected over other extensions that satisfy attributes at a lower ranking or order.

Figure 6:
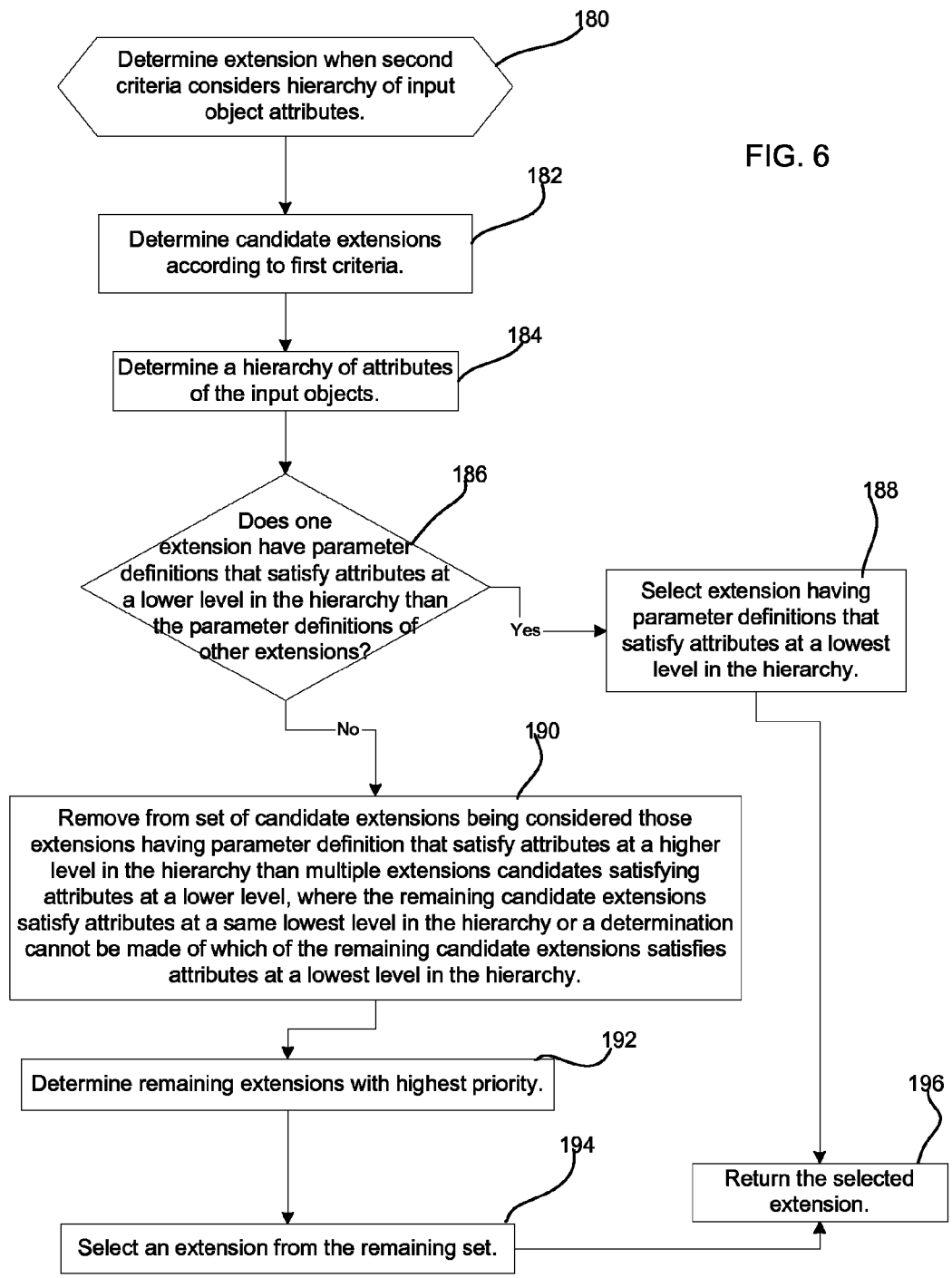
FIG. 6 illustrates an additional embodiment of operations to select an extension to use at an extension point in a program to process one or more input objects.

FIG. 6 illustrates an additional embodiment of operations the dispatcher 18 performs to select an extension 12 to use to process one or more input objects at an extension point in the computer program 10 when the attributes of the input objects are arranged in a hierarchy and assigned an optional priority. In response to a call (at block 180) to select an extension 12 for input objects, the dispatcher 18 determines (at block 182) candidate extensions 12 according to a first criteria. The dispatcher 18 may determine the set of candidate extension by determining whether the input objects are "assignable" (compatible) to the parameter definitions defined for each extension 12. In one embodiment, this determination may be made by a call to the first isAssignableFrom method in the IDispatchParameter interface 40. By delegating this determination to an object implementing the IDispatchParameter interface, the compatibility rules may be varied. By changing the implementation of IDispatchParameter associated with an extension, one could change the way the parameter hierarchy is defined or make some parameters optional. One possible implementation of IDispatchParameter may define an input object as compatible with a parameter if the type of the input object matches the type or is a subtype of the parameter object. Another possible implementation may define an input as compatible with a parameter if the attribute value of the input objects matches that of the parameter value in the extensions based on some rule or condition.

The dispatcher 18 determines (at block 184) a hierarchy of attributes of the input objects. The attribute hierarchy may be represented by an iDispatchParameter object associated with the registered extensions during initialization. The dispatcher 18 determines (at block 186) whether there exists a candidate extension that is associated with parameter definitions that satisfy attributes at a lower level in the hierarchy than the parameter definitions of all the other candidate extensions. This determination may be performed using the second isAssignableFrom method. If there is one extension 12 having parameter definitions satisfying attributes of the input objects at a lowest level in the hierarchy, then that extension 12 is selected (at block 188) to return, i.e., an extension whose parameter definitions satisfy attributes of the input object at a level in the hierarchy lower than other extensions Otherwise, if (at block 186) there is no one extension having parameter definitions satisfying attributes at a discernible lowest level in the hierarchy, then those extensions having parameter definitions that satisfy attributes at a higher level in the hierarchy than other extensions candidate satisfying attributes at a lower level are removed (at block 190) from the set of candidate extensions being considered. A determination cannot be made of which of the remaining candidate extensions satisfies attributes at a lowest level in the hierarchy if the remaining candidate extensions satisfy attributes at the same lowest level in the hierarchy or if the remaining candidate extensions satisfy attributes at different levels in the hierarchy, but no one extension satisfies attributes at a discernible lowest level in the hierarchy. The dispatcher 18 then determines (at block 192) the one or more remaining extensions having a higher (or lower) priority and selects one (at block 194) of those determined extensions 12 to return. From block 188 or 194, the selected extension is returned (at block 196).

In the IDispatchParameter interface 40, the second isAssignableFrom method may be called with the arguments of the candidate extensions in the hierarchical IDispatchParameter format to determine which candidate extension provides parameter definitions satisfying attributes of the input objects at a lowest level or subclass in the hierarchy of attribute values, as compared to the attribute values in the IDispatchParameter representation of the parameter values for the other extensions. As discussed an IDispatchParameter representation of the attributes of the input objects may be obtained using the getDispatchParameter method of a DelegateDefinition class providing methods to access information from the delegate definition objects 16.

In one embodiment, the dispatcher 18 may determine one or more extensions having parameter definitions satisfying attributes of the input objects at a lowest level in the hierarchy by comparing the parameter values for two extensions at a time, i.e., pairwise comparing, and then comparing the winner of the previous comparison with a yet unconsidered extension until a winner is located after all extensions are considered. The winner comprises the extension having parameter definitions satisfying the attributes of the input objects at a lowest level in the hierarchical representation of the attribute values.

In one embodiment, the dispatcher 18 may be invoked to transfer an input object to an output object. In such case, the hierarchical arrangement of attribute values for the source and target objects may provide different hierarchical levels of operating system attributes for the operating system for the source and target objects; hierarchical levels of attribute values for the object type, such as a file, database object, multimedia object; hierarchical levels of parameter values for the network transmission protocol that is used to transfer the object; and/or hierarchical levels of parameter values for the storage device on which the source and target objects are stored.

Described embodiments provide techniques to select an extension to use at an extension point in a computer program to process one or more objects passed at the extension point for processing. Described embodiments provide techniques to compare parameter values of the input objects and the extensions at different hierarchical levels or levels of specificity to select an extension whose parameter value attributes provide the greatest degree of specificity with respect to the parameter value attributes of the one or more objects to be processed.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the dispatcher is invoked at extension points in the computer program to select an extension to use to process one or more objects at the extension point. In alternative embodiments, the dispatcher may be invoked to select extensions at a point in the computer program unrelated to an extension point framework, such as that provided by the Eclipse Platform offered by International Business Machines Corp. In this way, the described embodiments may be used with different integrated development environment frameworks.

A tool can be provided to detect ambiguities during development time or runtime, such as the case where multiple candidate extensions remain after the application of the second criteria. In one embodiment, a user interface displaying all the known extension points may be provided to enable the developer to select the extension point of interest. The dispatcher 18 algorithm may then be run to determine input objects for which ambiguities exists so that these input objects and extension points are flagged.

In certain embodiments, a priority hint is provided for each extension as a value to resolve selection if multiple candidate extensions remain after application of the second criteria. In alternative embodiments, relative priority information may be specified in the metadata of the extensions to indicate if an extension should have higher priority than another explicitly. The dispatcher 18 can use this information to construct a partial ordering of the registered extensions, which can then be used to disambiguate the candidate extensions when there is no unique extension following the application of the second criteria.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIG. 2 provides an example of interfaces used to maintain information on extensions and select an extension to use to process one or more of the input objects. In additional embodiments, a different class structure and methods may be used to perform the operations of the dispatcher to select an extension to use to process objects at an extension point or other location in a program. Further, in alternative embodiments, the dispatcher 18 and methods may be implemented in a non-object oriented computing environment.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

indicating an association of parameter definitions with extensions in a runtime environment in a computer system in which a computer program is executing, wherein each extension comprises executable code and is selectable to process at least one input object as part of an operation in the computer program executing in the runtime environment;

receiving a call, in the runtime environment, for a dispatch interface method, wherein the dispatch interface method is at an extension point in the executing computer program and is called with information identifying at least one input object to process and with requirements for processing the at least one input object; and determining, by the called dispatch interface method, a set of candidate extensions capable of processing the at least one input object at the extension point based on the information on the input object in the call and a criteria for determining extensions whose parameter definitions indicate that the extensions are capable of processing the at least one input object while satisfying the requirements.

2. The method of claim 1, wherein the call includes multiple input objects, wherein the requirements indicate a number of expected input object parameters and at least one attribute of the input objects, and wherein the determined set of candidate extensions have parameter definitions indicating that they are capable of processing the expected input object parameters and input objects having the at least one attribute indicated in the extension point requirements.

3. The method of claim 1, wherein the criteria comprises a first criteria, further comprising:
selecting from the set of candidate extensions one extension to use to process the at least one object using a second criteria.

4. The method of claim 3, wherein the second criteria selects at least one extension having parameter definitions that satisfy attributes of the at least one input object with a greatest degree of specificity.

5. The method of claim 3, further comprising:
providing a first class interface having methods to indicate the association of the parameters with extensions; and
providing a second class interface having a first method to determine the set of candidate extensions based on the first criteria and a second method to determine the set of candidate extensions based on the second criteria.

6. The method of claim 1, wherein the extensions are provided by third party developers to be invoked at the extension point in program code.

7. The method of claim 1, wherein the at least one input object comprises a source object indicating objects in a file system from which to copy files and a target object indicating target objects to which the objects in the file system are written, and wherein the parameters associated with the source and target objects indicate an operating system and object type, wherein selecting one candidate extension comprises selecting one extension associated with parameters satisfying at least one of the operating system and object type parameters associated with the source and target objects.

8. A system, comprising:
a processor; and
code executed by the processor to cause the processor to perform operations, the operations comprising:
indicating an association of parameter definitions with extensions in a runtime environment executed by the processor in which a computer program is executing, wherein each extension comprises executable code and is selectable to process at least one input object as part of an operation in the computer program executing in the runtime environment;
receiving a call, in the runtime environment, at an extension point in the executing computer program, for a dispatch interface method, wherein the dispatch interface method is called with information identifying at least one input object to process and with requirements for processing the at least one input object; and
determining, by the called dispatch interface method, a set of candidate extensions capable of processing the at least one input object at the extension point based on the information on the input object in the call and a criteria for determining extensions whose parameter definitions indicate that the extensions are capable of processing the at least one input object while satisfying the requirements.

9. The system of claim 8, wherein the call includes multiple input objects, wherein the requirements indicate a number of expected input object parameters and at least one attribute of the input objects, and wherein the determined set of candidate extensions have parameter definitions indicating that they are capable of processing the expected input object parameters and input objects having the at least one attribute indicated in the extension point requirements.

10. The system of claim 8, wherein the criteria comprises a first criteria, wherein the operations further comprise:
selecting from the set of candidate extensions one extension to use to process the at least one object using a second criteria.

11. The system of claim 10, wherein the second criteria selects at least one extension having parameter definitions that satisfy attributes of the at least one input object with a greatest degree of specificity.

12. The system of claim 10, wherein the operations further comprise:
providing a first class interface having methods to indicate the association of the parameters with extensions; and
providing a second class interface having a first method to determine the set of candidate extensions based on the first criteria and a second method to determine the set of candidate extensions based on the second criteria.

13. The system of claim 8, wherein the extensions are provided by third party developers to be invoked at the extension point in program code.

14. The system of claim 8, wherein the at least one input object comprises a source object indicating objects in a file system from which to copy files and a target object indicating target objects to which the objects in the file system are written, and wherein the parameters associated with the source and target objects indicate an operating system and object type, wherein selecting one candidate extension comprises selecting one extension associated with parameters satisfying at least one of the operating system and object type parameters associated with the source and target objects.

15. An article of manufacture comprising a computer readable storage device having code executed to perform operations in a computer system, the operations comprising:
indicating an association of parameter definitions with extensions in a runtime environment in the computer system in which a computer program is executing, wherein each extension comprises executable code and is selectable to process at least one input object as part of an operation in the computer program executing in the runtime environment;
receiving a call, in the runtime environment, at an extension point in the executing computer program, for a dispatch interface method, wherein the dispatch interface method is called with information identifying at least one input object to process and with requirements for processing the at least one input object; and
determining, by the called dispatch interface method, a set of candidate extensions capable of processing the at least one input object at the extension point based on the information on the input object in the call and a criteria for determining extensions whose parameter definitions indicate that the extensions are capable of processing the at least one input object while satisfying the requirements.

16. The article of manufacture of claim 15, wherein the call includes multiple input objects, wherein the requirements indicate a number of expected input object parameters and at least one attribute of the input objects, and wherein the determined set of candidate extensions have parameter definitions indicating that they are capable of processing the expected input object parameters and input objects having the at least one attribute indicated in the extension point requirements.

17. The article of manufacture of claim 15, wherein the criteria comprises a first criteria, wherein the operations further comprise:
   selecting from the set of candidate extensions one extension to use to process the at least one object using a second criteria.

18. The article of manufacture of claim 10, wherein the second criteria selects at least one extension having parameter definitions that satisfy attributes of the at least one input object with a greatest degree of specificity.

19. The article of manufacture of claim 17, wherein the operations further comprise:
   providing a first class interface having methods to indicate the association of the parameters with extensions; and
   providing a second class interface having a first method to determine the set of candidate extensions based on the first criteria and a second method to determine the set of candidate extensions based on the second criteria.

20. The article of manufacture of claim 15, wherein the extensions are provided by third party developers to be invoked at the extension point in program code.

21. The article of manufacture of claim 15, wherein the at least one input object comprises a source object indicating objects in a file system from which to copy files and a target object indicating target objects to which the objects in the file system are written, and wherein the parameters associated with the source and target objects indicate an operating system and object type, wherein selecting one candidate extension comprises selecting one extension associated with parameters satisfying at least one of the operating system and object type parameters associated with the source and target objects.

* * * * *